United States Patent
Fedorovich

(10) Patent No.: US 6,485,022 B1
(45) Date of Patent: Nov. 26, 2002

(54) METALLIC LABYRINTH SEAL

(75) Inventor: George Fedorovich, Nacogdoches, TX (US)

(73) Assignee: JM Clipper Corporation, Nagodoches, TX (US)

( * ) Notice: Subject to any disclaimer, the term of this patent is extended or adjusted under 35 U.S.C. 154(b) by 0 days.

(21) Appl. No.: 09/539,881

(22) Filed: Mar. 31, 2000

(51) Int. Cl.⁷ .............................................. F16J 15/447
(52) U.S. Cl. ....................... 277/303; 277/413; 277/419; 277/421
(58) Field of Search ................. 277/303, 412, 277/413, 418, 419, 421

(56) References Cited

U.S. PATENT DOCUMENTS

| | | | |
|---|---|---|---|
| 3,586,404 A | * | 6/1971 | Zahn |
| 3,923,125 A | * | 12/1975 | Rosenthal ...................... 184/6 |
| 4,022,479 A | | 5/1977 | Orlowski |
| 4,304,409 A | * | 12/1981 | Orlowski |
| 4,379,600 A | * | 4/1983 | Muller ...................... 308/187.1 |
| 4,458,957 A | * | 7/1984 | Greener ...................... 308/187.1 |
| 4,679,801 A | * | 7/1987 | Poloni |
| 4,706,968 A | * | 11/1987 | Orlowski |
| 4,817,966 A | * | 4/1989 | Borowski |
| 4,848,937 A | | 7/1989 | Hartman et al. |
| 4,972,939 A | * | 11/1990 | Uttke et al. .................. 198/501 |
| 4,981,303 A | | 1/1991 | Matsushima et al. |
| 5,024,451 A | | 6/1991 | Borowski |
| 5,046,869 A | * | 9/1991 | Roberts et al. ............. 384/537 |
| 5,069,461 A | | 12/1991 | Orlowski |
| 5,074,408 A | * | 12/1991 | Smith et al. ................. 198/842 |
| 5,183,269 A | | 2/1993 | Black et al. |
| 5,186,472 A | | 2/1993 | Romero et al. |
| 5,188,214 A | * | 2/1993 | Uttke et al. .................. 198/501 |
| 5,316,317 A | | 5/1994 | Fedorovich et al. |
| 5,498,006 A | | 3/1996 | Orlowski |
| 5,522,601 A | | 6/1996 | Murphy |
| 5,649,710 A | | 7/1997 | Kanda |
| 5,727,095 A | * | 3/1998 | Hoeting ...................... 384/478 |
| 5,735,530 A | | 4/1998 | Merkin et al. |
| 5,908,195 A | * | 6/1999 | Sharrer ........................ 277/412 |
| 5,951,020 A | | 9/1999 | Orlowski |
| 5,967,524 A | | 10/1999 | Fedorovich |
| 6,024,362 A | * | 2/2000 | Fedorovich .................. 277/351 |
| 6,065,755 A | * | 5/2000 | Fedorovich |
| 6,206,182 B1 | * | 3/2001 | Wilson et al. ............... 198/842 |
| 6,234,489 B1 | * | 5/2001 | Orlowski et al. ........... 277/395 |

* cited by examiner

Primary Examiner—Anthony Knight
Assistant Examiner—Alison K. Pickard
(74) Attorney, Agent, or Firm—Dickstein Shapiro Morin & Oshinsky LLP

(57) ABSTRACT

A two-piece interlocked labyrinth seal device for providing a seal between a housing and a shaft formed of two ring members, specifically a rotor and stator, connected to each other by a plastically deforming unitizing element. The rotor further includes one or a series of protrusions and recesses for providing a tortuous passage for fluid travel within the seal device. The system can be used on rotating shafts, rotating bores or as a baffle and has improved oil retention and water exclusion properties.

31 Claims, 6 Drawing Sheets

METALLIC LABYRINTH SEAL

BACKGROUND

The invention generally relates to a device for providing a seal between a shaft and a housing. In particular, the invention relates to a dynamic, metallic labyrinth seal device for preventing lubricant from leaking out of a housing and/or for preventing contaminants from traveling into the housing. The invention also relates to a labyrinth seal device capable of functioning in high temperature environments. The invention also relates to a method of assembling a sealed system.

Prior art devices for sealing a rotating shaft are disclosed in U.S. Pat. No. 4,022,479 (Orlowski) and U.S. Pat. No. 5,024,451 (Borowski). Seal devices of this type may be used to prevent lubricant from escaping out of a bearing housing and/or to prevent contaminants from working their way into the housing. The prior art devices are formed of at least two ring-shaped members that rotate with respect to each other when the shaft is rotated. One of the members is fixed to the housing and does not rotate. The other member rotates with the rotating shaft.

The two ring members should be located very close together, particularly when the seal device is used to isolate the bearing from small particulate contaminants. Even small quantities of such contaminants are capable of significantly deteriorating the bearing. To prevent such contamination, the two relatively rotatable ring members must be held together very closely, with only a very narrow space therebetween.

The ring members of the Orlowski seal device are connected together by a separate securing means. The ring members themselves have no means for establishing and maintaining a narrow spacing therebetween. Therefore, the Orlowski seal device cannot be manufactured as a unit with a preset, fixed spacing. The spacing between the ring members has to be set when the seal device is installed into the housing. This leaves room for human error outside the control of the device manufacturer. In particular, the Orlowski device can be improperly installed, with the ring members located too far apart to perform satisfactorily. Another problem with the Orlowski device is that the ring members may be separated subsequent to installation, for example by high pressure cleaning spray.

The ring members of the Borowski device are held together by a bead and a groove provided on the ring members themselves. The bead fits within the groove with an interference fit. This arrangement is an improvement over the Orlowski system in the sense that no separate securing means is needed. But the Borowski device is still unsatisfactory because the bead must be resiliently deformed to be positioned within the groove, and the groove must be correspondingly enlarged to receive the deformed bead. The deformation of the bead during assembly makes it difficult to achieve the desired close positioning between the two ring members. Further, the Borowski device, which incorporates three members, is unsatisfactory for having a greater number of potential leakage paths than seal devices utilizing only two members.

Prior art devices do not disclose unitized labyrinth seals which are capable of operating in high temperature environments, such as during fires. Conventional seal devices composed of TEFLON® or other similar material, when exposed to high temperatures, may warp, deform or disintegrate, causing a failure in the device to dynamically seal.

SUMMARY

The disadvantages of the prior art are alleviated to a great extent by the present invention which provides a metallic seal device including a rotor and a stator having a plastically deformable unitizing element.

In a preferred embodiment of the present invention, the plastically deformable unitizing element is located on the stator and is made to plastically deform radially outwardly to interlock the stator and rotor.

In one aspect of the present invention, the rotor has an annular protrusion to aid in the labyrinth sealing effect and the seal may be a severe splash type seal.

In another preferred embodiment, the unitizing element of the stator plastically deforms radially inwardly and the stator may contain an annular protruding element to add to the labyrinth sealing effect.

In another preferred embodiment, the unitizing element is located on the rotor which interlocks into a recess located in the stator.

Another object of the present invention is to use the metallic plastically deformable unitizing element to create a seal which can be used as an internal baffle to control the movement of fluid contaminant.

DETAILED DESCRIPTION OF PREFERRED EMBODIMENTS

Figure 1:
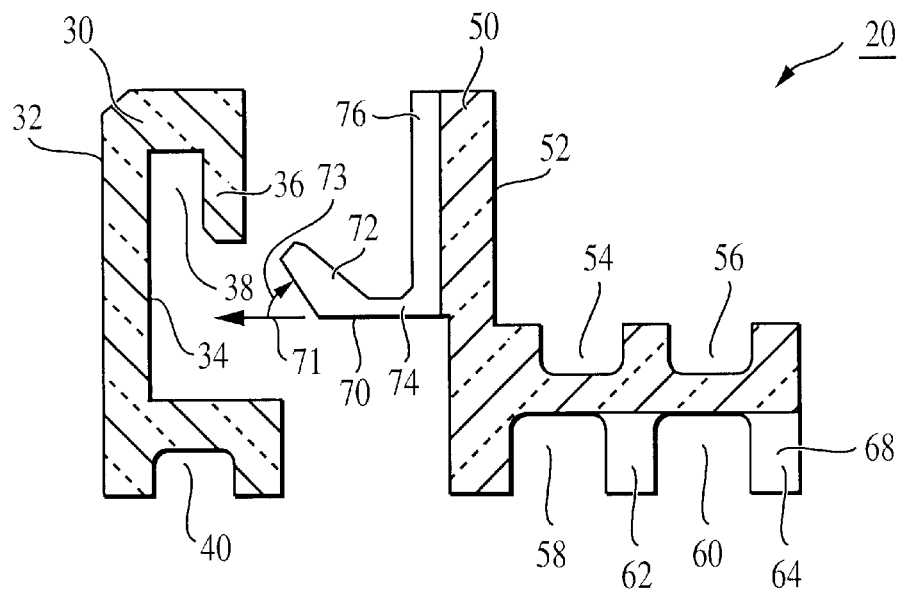
FIG. 1 is a schematic view of a seal device constructed in accordance with a first embodiment of the invention.
Figure 2:
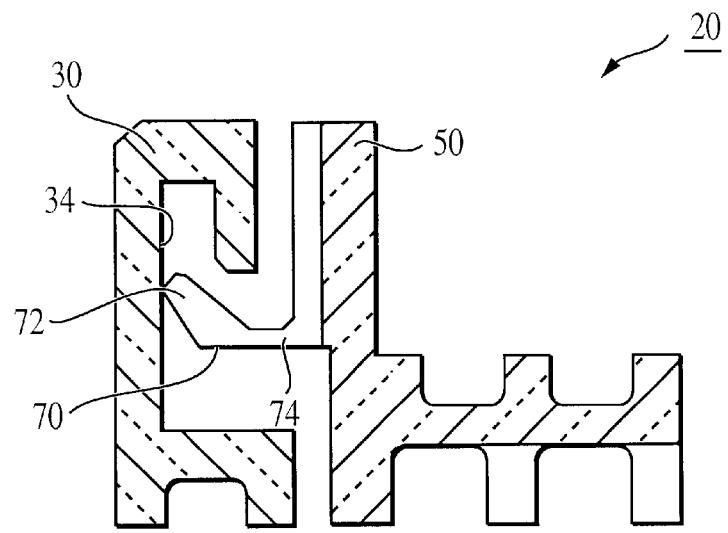
FIG. 2 is another schematic view of the seal device of FIG. 1.
Figure 3:
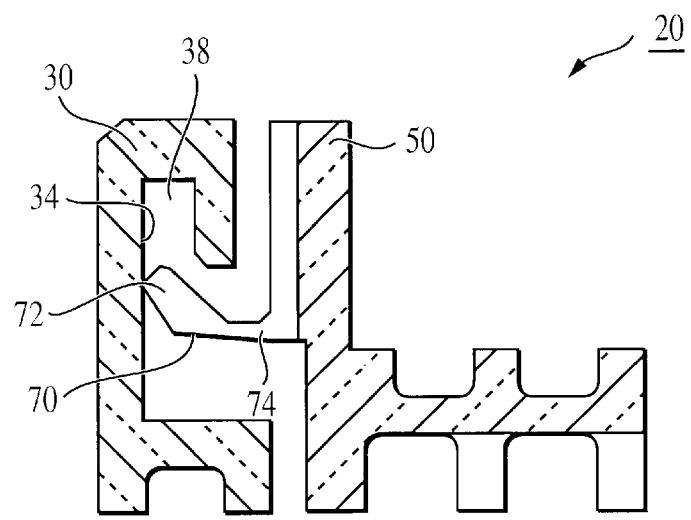
FIG. 3 is another schematic view of the seal device of FIG. 1.

FIGS. 1–3 illustrate a ring-shaped seal device 20 constructed in accordance with a preferred embodiment of the invention. The seal device 20 includes a rotor member, or rotor, 30 and a stator member, or stator, 50 in an unassembled position, as seen in FIG. 1. The rotor 30 has an outer surface 32, an inner surface 34, and an inner protrusion 36. A recess 38 is formed between the inner surface 34 and the inner protrusion 36. The rotor 30 also has a shaft sealing groove 40 which receives a sealing element, such as an O-ring 77 (FIG. 4), for providing a tight seal between the rotor 30 and a rotatable shaft 221. Moreover, the radial compression of the sealing element 77 between the shaft 221 and rotor 30 is sufficient to make the rotor 30 rotate in unison with the shaft 221.

The stator 50 includes a stator housing mating surface 52, housing sealing grooves 54, 56, annular grooves 58, 60, annular protrusions 62, 64, and a unitizing element 70. The housing sealing grooves 54, 56 are designed to allow sealing elements, such as O-rings, 79, 81 (FIG. 4) to be placed between a housing 111 and the stator 50. The radial compression of the sealing elements 79, 81 between the housing 111 and stator 50 is sufficient to prevent the stator 50 from rotating with respect to the housing 111. The annular grooves 58, 60 and the annular protrusions 62, 64 work with an axial groove 68 to return fluid to the housing 111.

Although it is preferred to provide the seal device 20 with sealing elements, such as the O-rings 77, 79, 81, the seal device 20 may be machined to close tolerances and press fit, by an arbor press or by hammering the device 20 into place, around the shaft. Further, the seal design can be made as small as 3/16" in shaft to bore cross-section and the seal width can be reduced when there is a space limitation where the seal 20 is to be used.

In operation the stator 50 sealing elements 79 and 81 inhibit oil from escaping out of the housing 111 around the outside of the stator 50 and the rotor sealing element 77 inhibits contaminants from traveling into the housing 111 along the surface of the shaft 221. Oil and contaminants are dynamically prevented from traveling through the interface between the rotor 30 and stator 50.

The unitizing element 70 has a locking portion 72 and a deformable portion 74. The locking portion 72 is designed and sized to fit within the recess 38 in a manner which locks the rotor 30 and stator 50 together and provide a close positioning between the rotor 30 and stator 50. Specifically, the unitizing element 70 is designed and sized to maintain a gap 75 (FIG. 4) between the locking portion 72 and the inner protrusion 36 and a gap 82 (FIG. 4) between the rotor 30 and the stator 50. The deformable portion 74 is designed and sized to allow for deformation during assembly yet still maintain its strength after deformation to lock together the rotor 30 and the stator 50 and thus unitize the seal 20.

The unitizing element 70 is preferably machined to form the locking portion 72 at an angle 73 so that when the rotor 30 is pressed against it in a direction 71, as in an arbor press, it is forced to move plastically outward into the recess 38 in the rotor 30. The unitizing element 70 instead may be machined straight and then partially preformed prior to assembly, with the final forming occurring during assembly of the rotor 30 and stator 50. The unitizing element 70 optionally may have a drainage passage 76 cutout to allow passage of contaminants out of the seal 20. When the drainage passage 76 is cut out of the unitizing element 70 the ends may flare out, however, the edges of the ends may be removed by grinding prior to assembly.

The rotor 30 and stator 50 may be made of a suitable high temperature material such as a metallic substance, most preferably bronze. The stator 50 and rotor 30 may also be comprised of metallic alloys. The sealing elements or O-rings 77, 79, 81 may be made of a suitable elastomeric material or material suitable for high temperatures.

FIGS. 2–3 show various stages of assembly and specifically the deformation of the unitizing element 70. As seen in FIG. 2, the locking portion 72 meets the inner surface 34 of the rotor 30. When enough force is applied to the rotor 30 during assembly, the inner surface 34 pushes against the locking portion 72 of the unitizing element 70. As shown in FIG. 3, the unitizing element 70, specifically the deformable portion 74, is bent or deformed allowing the locking portion 72 to enter the recess 38 of the rotor 30.

The material composition of the unitizing element 70 should be such that force may be used to shape, or plastically deform, it. The range of possible compositions may be increased if heat is used in the forming stage. The unitizing element 70, depending upon its material composition, may however have a certain degree of elastic rebound. The unitizing element 70 is to be formed such that its elastic rebound takes into account the desire to maintain gaps 75 and 82 to maintain axial play greater than zero. Further, when fit together, the rotor 30 and the stator 50 may be in relaxed contact with each other via the unitizing element 70. By relaxed contact is meant that there are no or minimal compression forces between the rotor 30 and the stator 50. In operation and/or during assembly, any contact between the rotor 30 and the stator 50 is likely to be broken and the rotor 30 and the stator 50 will remain interconnected, with only intermittent contact, which is unnecessary for sealing.

Figure 4:
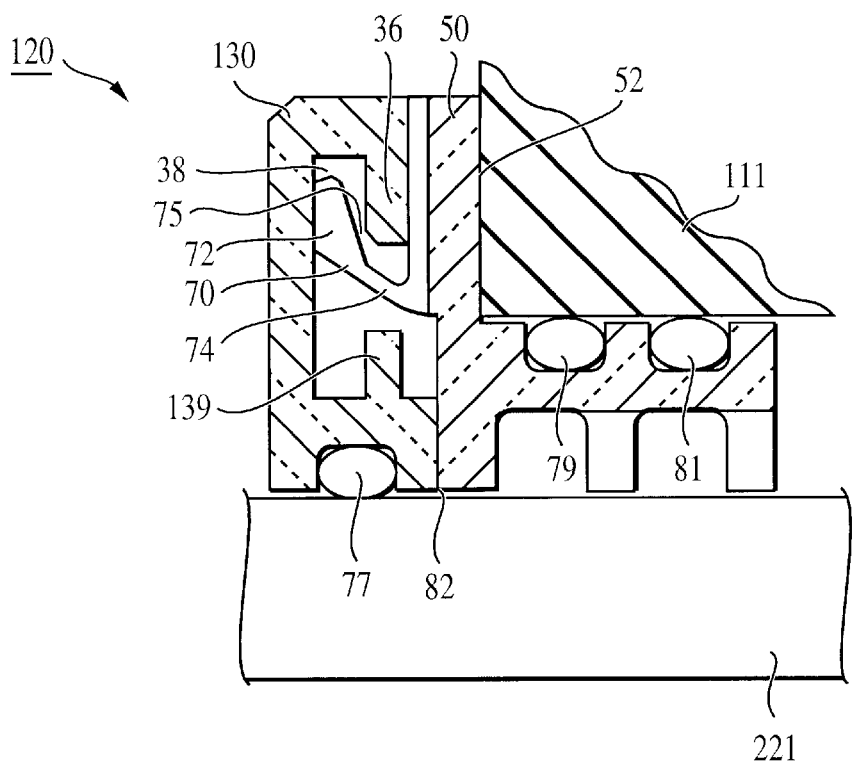
FIG. 4 is a schematic view of a seal device constructed in accordance with a second embodiment of the invention.

FIG. 4 shows a seal 120 wherein the unitizing element 70, specifically the locking portion 72, is locked into the recess 38 of a rotor 130. The rotor 130 includes an annular protruding ridge 139, adds to the labyrinth sealing effect of the seal 120. The deformable portion 74 of unitizing element 70 is bent plastically to allow the locking portion 72 to set itself into the recess 38 of rotor 30. Since the deformation of the unitizing element 70 is a plastic deformation, as compared to an elastic deformation, the unitizing element 70 is permanently deformed. An elastically deformed element would continue to apply a constant force to reform to its original shape.

Figure 5:
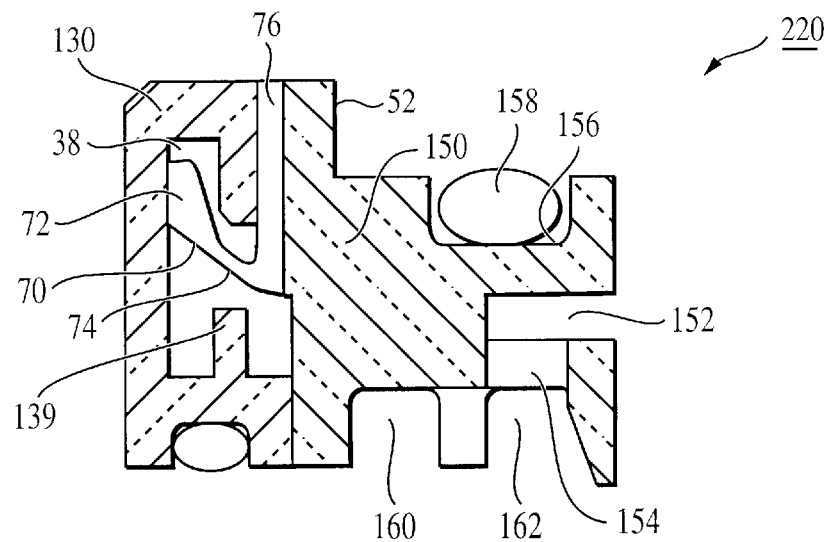
FIG. 5 is a schematic view of a seal device constructed in accordance with a third embodiment of the invention.

Illustrated in FIG. 5 is a severe splash type seal 220, which includes a stator 150 having a splash recess 152 which is fluidly connected to a drainage passage 154. The stator 150 further includes a housing sealing groove 156, its corresponding sealing element 158, and shaft sealing grooves 160, 162.

Figure 6:
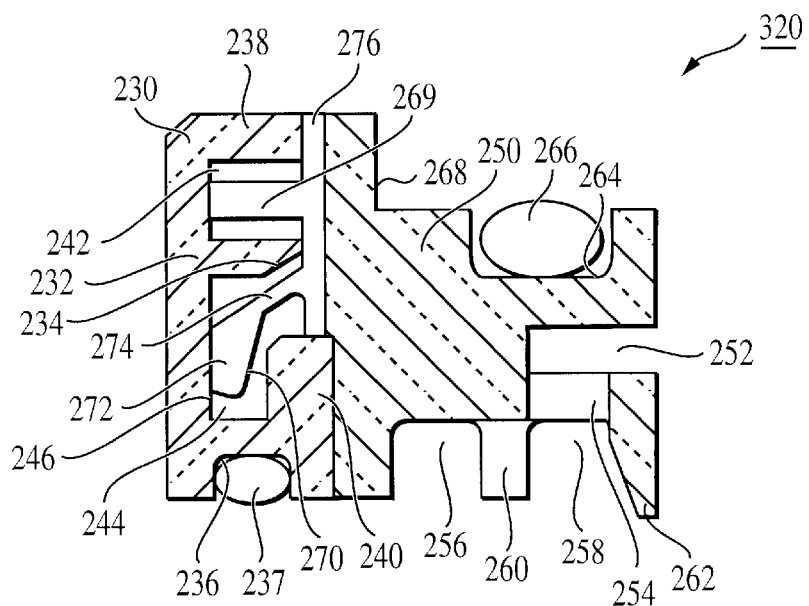
FIG. 6 is a schematic view of a seal device constructed in accordance with a fourth embodiment of the invention.

A severe splash seal 320 is shown in FIG. 6 and includes a rotor 230 and a stator 250 having a unitizing element 270 which plastically deforms radially inwardly toward the shaft 221. A severe splash seal, such as the seal 320, is one which includes a remote drain back to the fluid side of the housing. The rotor 230 includes a protrusion 232 with a slanted tip portion 234, a shaft sealing groove 236, an outer portion 238, and an inner protrusion 240. An annular recess 242 is formed between the outer portion 238 and the protrusion 232. Further a recess 244 is formed between an inner surface 246 and the inner protrusion 240. The shaft sealing groove 236 is designed to receive a sealing element 237.

The stator 250 shown in FIG. 6 contains a splash recess 252 with a corresponding fluid drainage passage 254, annular grooves 256, 258, annular ridges 260, 262, a housing sealing groove 264 and its corresponding sealing element 266, a stator housing mating surface 268, and the unitizing element 270. The unitizing element 270 includes a locking portion 272, a deformable portion 274, an optional drainage passageway 276, and an annular lip protrusion 269. The stator 250 could also be in the form of a nonsevere splash embodiment as depicted in FIGS. 1–3.

The unitizing element 270 differs from the unitizing element 70 in that the unitizing element 270 deforms toward the shaft 221. The unitizing element 270 is locked into the recess 244 of the rotor 230. The annular lip protrusion 269 along with the annular recess 242 create a tortuous passage for fluid or contaminants to flow, thereby enhancing the labyrinth sealing effect. The slanted portion 234 of the protrusion 232 aids in the movement of the unitizing element 270 during assembly. The locking portion 272 may come into contact with the slanted portion 234 which would then guide the locking portion 272 towards the recess 244.

Figure 7:
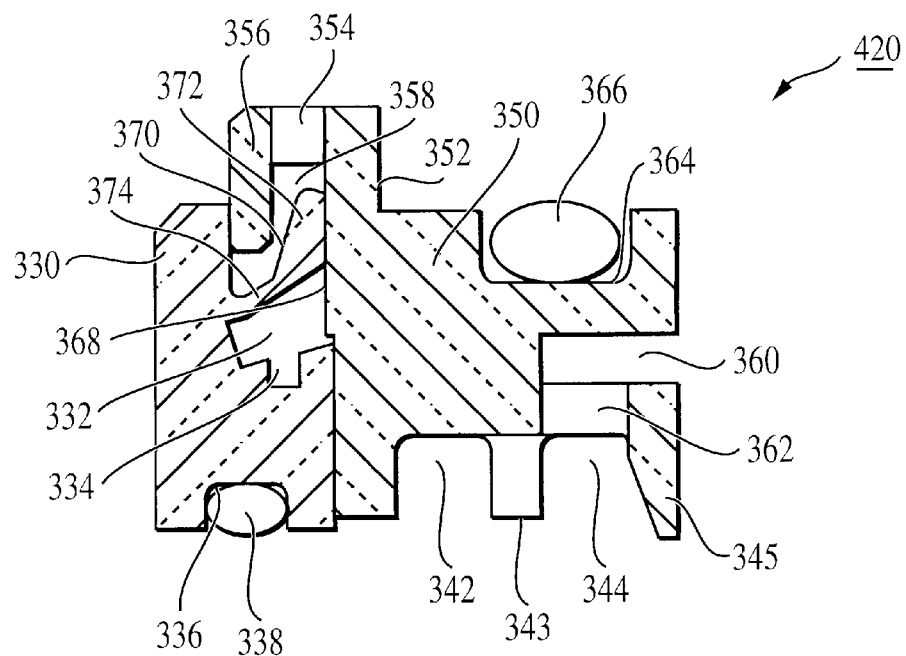
FIG. 7 is a schematic view of a seal device constructed in accordance with a fifth embodiment of the invention.

FIG. 7 shows another seal device 420 with a rotor 330 and a stator 350. A unitizing element 370 extends from the stator 350. The rotor 330 further includes an inner space 332, a recess or groove 334, and a shaft sealing groove 336 with its corresponding sealing element 338. The unitizing element 370 has a locking portion 372 and a deformable portion 374. The stator 350 has a stator mating surface 352, an optional drainage passage 354, an protrusion 356, a recess 358 formed between the protrusion 356 and the main portion of the stator 350.

The stator 350 further includes a splash recess 360, a drainage passage 362, a housing sealing groove 364 with its corresponding sealing element 366, annular grooves 342, 344, and annular protrusions 343, 345.

During assembly, the rotor 330 is forced to mate with the stator 350. The forced mating of the rotor 330 and stator 350 causes the locking portion 372 to contact the inner portion 368 of the stator 350. The unitizing element 370, when sufficiently pressed against the inner portion 368, begins to plastically deform at the deformable portion 374. The plastic deformation permanently locks the locking portion 372 into the recess 358.

Figure 8:
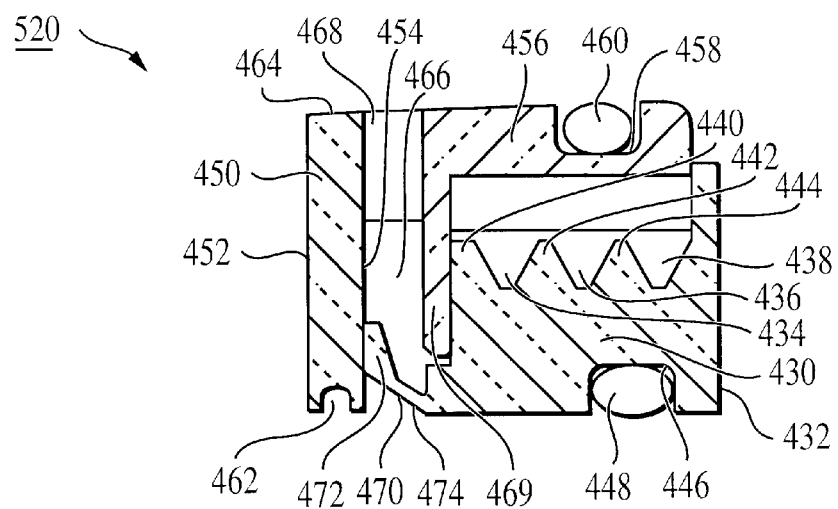
FIG. 8 is a schematic view of a seal device constructed in accordance with a sixth embodiment of the invention.

FIG. 8 illustrates a seal device 520 a stator 450 with an outer surface 452, an inner surface 454, a main stator body portion 456, a housing sealing groove 458 with its corresponding sealing element 460, and a shaft sealing recess 462. The seal 520 further includes a rotor 430 having a rotor outer surface 432, a series of recesses 434, 436, 438, a series of annular protrusions or ridges 440, 442, 444, a unitizing element 470, and a shaft sealing groove 446 with its corresponding sealing element 448. The unitizing element 470 includes a locking portion 472 and a deformable portion 474.

The unitizing element 470 is locked into an annular recess 466 formed between the inner surface 454 and an inner protrusion 469. The stator 450 also has a drainage passage 468 fluidly connected to recess 466. The recesses 434, 436, 438 and the annular protrusions or ridges 440, 442, 444 create a torturous passageway thus enhancing the labyrinth effect of the seal. Also, the stator 450 includes a slanted surface 464 which allows the seal 520 to be seated deep within a housing.

Figure 9:
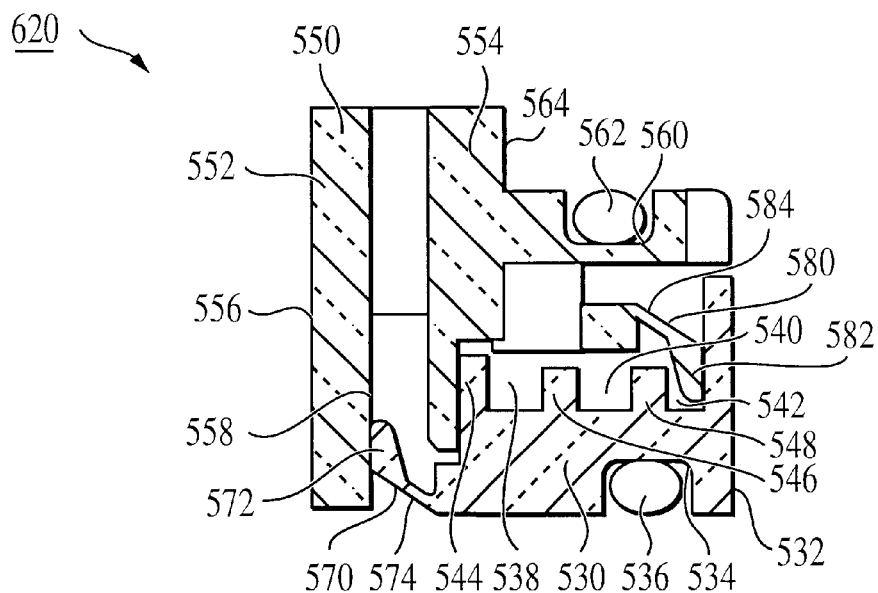
FIG. 9 is a schematic view of a seal device constructed in accordance with a seventh embodiment of the invention.

A seal device 620 is shown in FIG. 9. The seal device 620 includes a rotor 530 and a stator 550. A unitizing element 570 is on the rotor 530 and unitizing element 580 is on the stator 550. The stator 550 has a stator cover portion 552, a main stator body portion 554, an outer surface 556, an inner surface 558, a bore sealing groove 560 with its corresponding sealing element 562, and a main stator body shoulder 564. The stator unitizing element 580 has a locking portion 582 and a deformable portion 584.

The rotor 530 includes a rotor outer surface 532, a shaft sealing recess 534 with its corresponding sealing element 536, a series of recesses 538, 540, 542, and a series of ridges or protrusions 544, 546, 548. The rotor unitizing element 570 is comprised of a locking portion 572 and a deformable portion 574.

The seal device 620 shown in FIG. 9 is assembled by pushing the stator 550 and rotor 530 together in a manner which plastically deforms the rotor unitizing element 570 and the stator unitizing element 580. The plastic deformation of the unitizing elements 570, 580 causes a permanent deformation which interlocks the stator 550 and the rotor 530. The ridges or protrusions 544, 546, 548 and recesses 538, 540, 542 create a torturous passageway which enhances the labyrinth sealing effect of the seal.

Figure 10:
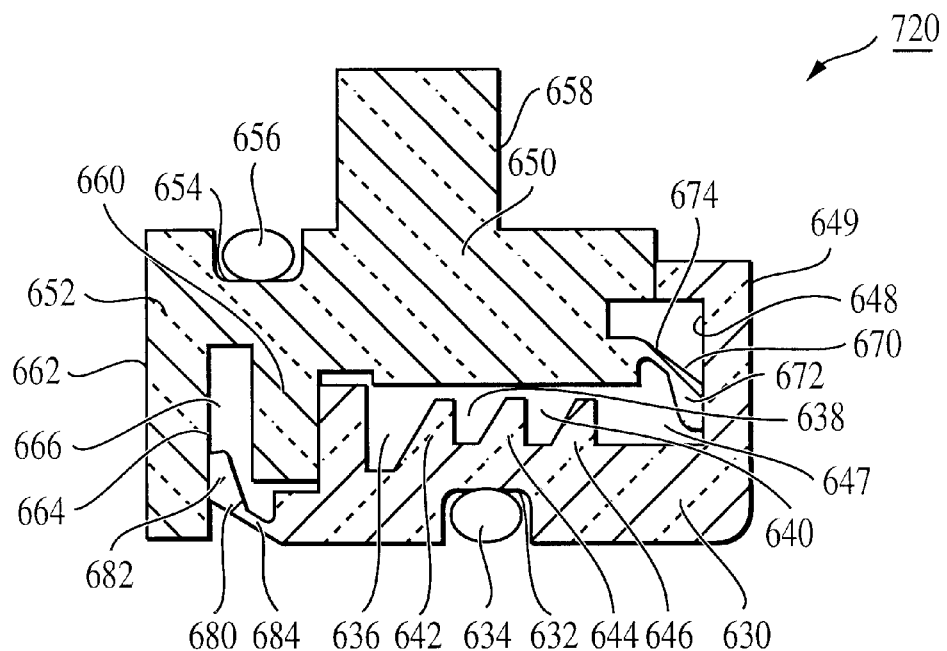
FIG. 10 is a schematic view of a seal device constructed in accordance with an eighth embodiment of the invention.

FIG. 10 shows a seal device 720 having a stator 650 and a rotor 630, each containing a unitizing element 670, 680.

The stator 650 includes a stator cover surface 652, a housing sealing groove 654 with a corresponding sealing element 656, a shoulder portion 658, a radial inner protrusion 660, an outer surface 662, an inner surface 664, and a recess 666 formed between the outer surface 662 and the radial inner protrusion 660. The stator 650 also contains the unitizing element 670 which includes a locking portion 672 and a deformable portion 674.

The rotor 630 has a shaft sealing groove 632 with a corresponding sealing element 634, multiple recesses 636, 638, 640, and multiple protrusions or ridges 642, 644, 646. A recess or void 647 is created between the ridge 646 and an inner surface 648 of a rotor outer wall 649. The rotor unitizing element 680 includes a locking portion 682 and a deformable portion 684.

During assembly, the unitizing elements 670, 680 are plastically and permanently deformed into their corresponding recess 666, 647. The multiple protrusions or ridges 642, 644, 646 and multiple recesses 636, 638, 640, 647 create a torturous passageway which enhances the labyrinth sealing effect of the seal 720.

Figure 11:
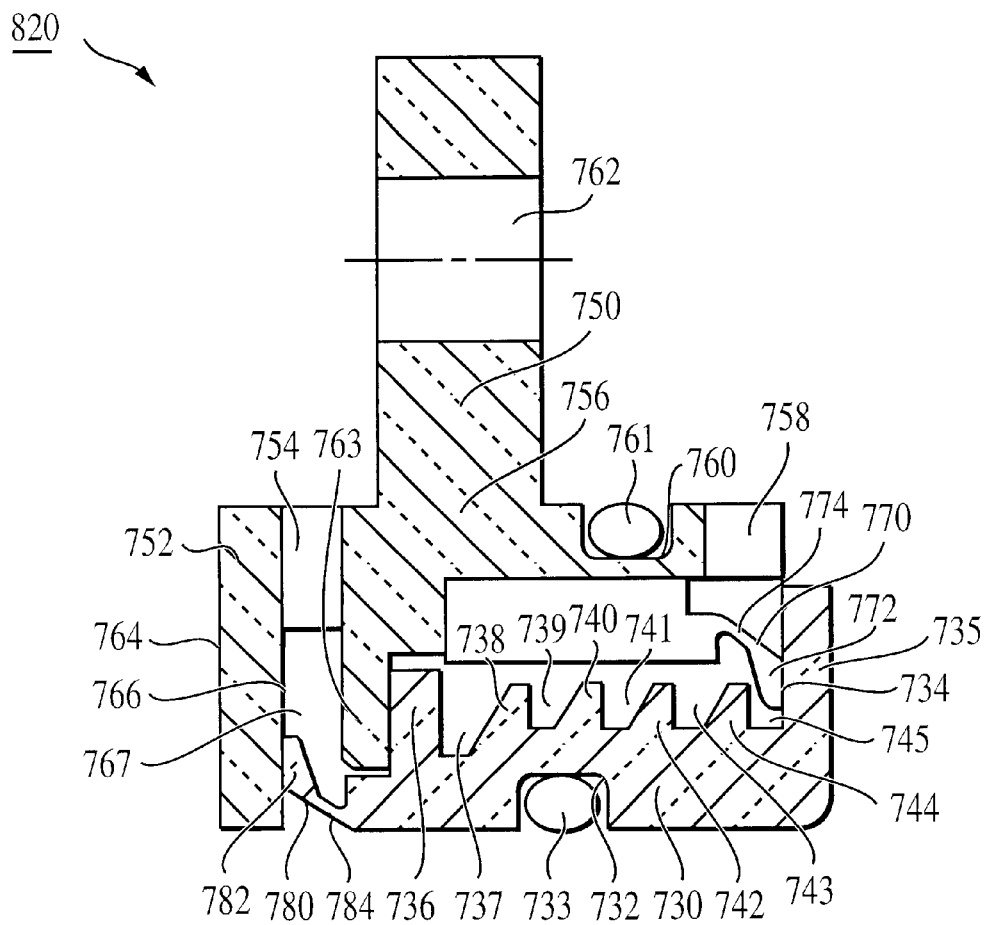
FIG. 11 is a schematic view of a seal device constructed in accordance with a ninth embodiment of the invention.

A seal device 820 is shown in FIG. 11, and it includes a rotor 730 and a stator 750. Multiple unitizing elements 770, 780 are used to interlock the stator 750 and the rotor 730. The stator 750 has a cover portion 752, which contains an optional cover portion drainage passage 754, a main stator body 756 with a main stator body drainage passage 758, a housing sealing groove 760 with a corresponding sealing element 761, a mounting hole 762 for mounting onto a bore housing (not shown), an inner protrusion 763, an outer surface 764, and an inner surface 766. A recess 767 is formed between the inner surface 766 and the inner protrusion 763. The stator 750 also has a stator unitizing element 770 which includes a locking portion 772 and a deformable portion 774.

The rotor 730 has a shaft sealing groove 732 with its corresponding sealing element 733, an inner surface 734, an outer wall 735, an inner protrusion 736, multiple recesses 737, 739, 741, 743, and multiple protrusions or ridges 738, 740, 742, 744. A recess or void 745 is formed between protrusion 744 and the outer wall 735. The rotor 730 also contains a unitizing element 780 which has a locking portion 782 and a deformable portion 784.

The stator 750 and rotor 730 are interlocked via the unitizing elements 770, 780. The unitizing element 780, specifically the locking portion 782, is locked into the recess 767. The unitizing element 770, specifically the locking portion 772 is locked into recess 745. During assembly, the unitizing elements 770, 780 are plastically deformed, specifically at the deformable portions 774, 784. The plastic deformation of the unitizing elements 770, 780 permanently locks the stator 750 and rotor 730 together. The protrusions or ridges 738, 740, 742, 744 and the recesses 737, 739, 741, 743, 745 create a torturous passageway for fluid or contaminants thereby providing a labyrinth sealing effect for the seal 820.

While the foregoing has described in detail preferred embodiments known at the time, it should be readily understood that the invention is not limited to the disclosed embodiments. Rather, the invention can be modified to incorporate any number of variations, alterations, substitutions or equivalent arrangements not heretofore described, but which are commensurate with the spirit and scope of the invention. For example, while seal devices which have only intermittent contact between their constituent members have been described, it is to be understood that the unitizing elements described herein may be used in seal devices which contain non-labyrinth type seal features, both a labyrinth portion and a contact portion such as a lip seal. Additionally, although annular grooves for receiving sealing elements have been described an illustrated in pairs, in some circumstances a single such groove, with or without a sealing element, may be sufficient. Accordingly, the invention is not to be seen as limited by the foregoing description, but is only limited by the scope of the appended claims.

What is claimed as new and desired to be protected by letters patent of the United States is:

1. A labyrinth seal device, comprising:
   a stator;
   a rotor being rotatable with respect to said stator;
   a first sealing element for providing a seal between said stator and a housing, and a second sealing element for providing a seal between said rotor and a shaft; and
   an internally positioned plastically deformable unitizing element adapted to interconnect said stator and rotor such that an axial play greater than zero is maintained between said stator and rotor.

2. The seal device of claim 1, wherein said unitizing element extends from said stator into a recess of said rotor when deformed.

3. The seal device of claim 2, wherein said rotor includes at least one inner protrusion and one inner recess.

4. The seal device of claim 2, wherein said device is a severe splash device.

5. The seal device of claim 2, wherein said stator includes an annular ridge and said rotor includes an annular recess for mating with said annular ridge to provide an additional seal.

6. The seal device of claim 2, wherein said unitizing element is plastically deformed radially outward.

7. The seal device of claim 2, wherein said unitizing element is plastically deformed radially inward.

8. The seal device of claim 2, wherein said rotor further includes an internally positioned plastically deformable unitizing element which extends into a recess of said stator when deformed.

9. The seal device of claim 1, wherein said unitizing element extends from said rotor into a recess of said stator when deformed.

10. A sealed system having an interconnected labyrinth seal device, comprising:
    a housing;
    a shaft extending through said housing and being rotatable relative to said housing;
    a stator;
    a first sealing element for providing a seal between said stator and said housing;
    a rotor non-rotatable relative to said shaft;
    a second sealing element for providing a seal between said rotor and said shaft; and
    an internally positioned plastically deformable unitizing element adapted to interconnect said stator and rotor such that an axial play greater than zero is maintained between said stator and rotor.

11. The sealed system of claim 10, wherein said unitizing element extends from said stator into a recess of said rotor when deformed.

12. The sealed system of claim 11, wherein said rotor includes at least one inner protrusion and one inner recess.

13. The sealed system of claim 11, wherein said device is a severe splash device.

14. The sealed system of claim 11, wherein said stator includes an annular ridge and said rotor includes an annular recess for mating with said annular ridge to provide an additional seal.

15. The sealed system of claim 11, wherein said unitizing element is plastically deformed radially outward.

16. The sealed system of claim 11, wherein said unitizing element is plastically deformed radially inward.

17. The sealed system of claim 11, wherein said rotor further includes an internally positioned plastically deformable unitizing element which extends into a recess of said stator when deformed.

18. The sealed system of claim 10, wherein said unitizing element extends from said rotor into a recess of said stator when deformed.

19. A method of assembling an interconnected labyrinth seal device, said method comprising the steps of:
    providing a first ring member;
    providing a second ring member, one of said ring members having a recess and the other having a unitizing element;
    providing a first sealing element for creating a seal between said first member and a housing;
    providing a second sealing element for creating a seal between said second member and a shaft;
    positioning said unitizing element against one of said ring members; and
    pressing said ring members together such that said unitizing element plastically deforms into said recess thereby interconnecting said ring members.

20. The method of claim 19, wherein said first ring member is a stator and said second ring member is a rotor, said step of positioning said unitizing element includes positioning it against said rotor, wherein said rotor includes a recess to receive said unitizing element.

21. The method of claim 20, further comprising the steps of forming an inner protrusion on said rotor for enhancing labyrinth sealing.

22. The method of claim 20, wherein said step of pressing said ring members together deforms said unitizing element radially outwardly.

23. The method of claim 20, wherein said step of pressing said ring members together deforms said unitizing element radially inwardly.

24. The method of claim 23, further including providing a protrusion on said rotor having a slanted tip for guiding said unitizing member during deformation.

25. The method of claim 19, further comprising machining said unitizing element into a semi-formed shape prior to assembly.

26. The method of claim 19, further comprising machining said unitizing element straight and then preforming said unitizing element prior to assembly.

27. The method of claim 19, further comprising cutting a fluid passage in said unitizing element.

28. The method of claim 27, further comprising the steps of grinding an edge of said fluid passage prior to assembly.

29. The method of claim 19, wherein said first ring member is a stator and said second ring member is a rotor, said step of positioning said unitizing element includes positioning it against said stator, wherein said stator includes a recess to receive said unitizing element.

30. The method of claim 29, wherein said step of pressing said ring members together deforms said unitizing element radially outwardly.

31. The method of claim 19, wherein both ring members have a unitizing element and both ring members have a recess, said step of pressing said ring members together plastically deforms both said unitizing elements into respective said recesses thereby interconnecting said ring members.

* * * * *